Sept. 20, 1971   H. C. GLESMANN   3,605,903
SPEED CONTROL SYSTEM FOR A VEHICLE
Filed July 25, 1969   2 Sheets-Sheet 1

Inventor:
Herbert C. Glesmann
By Hofgren, Wegner,
Allen, Stellman & McCord
Att'ys United States Patent Office 3,605,903
Patented Sept. 20, 1971

3,605,903
SPEED CONTROL SYSTEM FOR A VEHICLE
Herbert C. Glesmann, Omaha, Nebr., assignor to
Omsteel Industries, Inc.
Filed July 25, 1969, Ser. No. 844,892
Int. Cl. A01b 67/00
U.S. Cl. 172—3       14 Claims

ABSTRACT OF THE DISCLOSURE

A speed control system for a vehicle including manually operable control means for a variable speed drive and settable to a plurality of positions corresponding to a plurality of different ground traversing speeds, and override means operative to temporarily override the manual control to alter the speed of the vehicle without changing the setting of the manually operable control. In one form of the invention, the override means comprises a manually actuable operator while in another, sensing means are provided to sense when a work performing means requires more time to perform a given job to thereby decrease the rate of speed of the vehicle.

BACKGROUND OF THE INVENTION

Recent years have seen an increasing use of hydrostatic transmissions in various vehicles such as tractors or the like due to the obvious advantage of their being settable to an infinite number of speeds. Such a characteristic is of particular advantage in conjunction with vehicles which bear a work performing means such as a mower or a trenching device which will normally be moved across the ground at as fast a rate as possible without overloading the work performing means. Thus, where the load is relatively constant, the speed of the vehicle may be set with complete precision.

However, very few situations are encountered in practice where the load for such work performing means remains relatively constant. For example, in rough mowing applications, the nature of the grass or weeds being cut vary and as a result, the amount of work expended to cut the weeds or grass must vary. Similarly, in trenching applications, the nature of the ground in which the trench is being dug will vary from time to time and even if the same does not appreciably vary, when the boom of the trencher is maintained at a constant attitude with respect to the vehicle, a change in the terrain may tend to cause the boom to "dig in" to the ground thereby increasing the amount of work required.

Furthermore, there are any number of contingencies that may come up during an operation which require a temporary alteration in the speed of the vehicle. For example, there are "so-called" panic situations as when a child might dart in front of the vehicle. Alternatively, when the vehicle is required to operate close to an obstruction such as a fence or the like, the operator may wish to temporarily slow to a more cautious pace.

SUMMARY OF THE INVENTION

It is the principal object of the invention to provide a new and improved speed control device for vehicles including a manual control for a variable speed device which is settable to a plurality of positions for a plurality of different ground traversing speeds and override means for the control means operable to temporarily alter the speed of the drive means and thus the rate at which the vehicle traverses the ground and yet which will, when operation of the override means is terminated, permit the vehicle to traverse the ground at the rate previously set on manually oprable control means.

In one embodiment of the invention, the override means comprises a manually actuable operator in the form of a foot pedal. The operator of the vehicle may selectively alter the speed by selectively depressing the foot pedal and, in panic situations, may completely halt the vehicle through the use of the foot pedal. In a second embodiment of the invention, the override means include a device for sensing a change in the amount of work to be performed by a work performing means associated with the vehicle together with means for operating the override means so that vehicle speed will be decreased as the amount of work to be performed increases.

The foregoing is achieved through the use of a hydraulic piston pump which is operated by a linkage controlled both by the manually actuable operator and the override means. The linkage is designed so that when the override means is not in use, movement of a control shaft associated with the swash plate of the hydraulic piston pump is controlled by shifting a link about a pivot point through a linkage associated with the manually actuable operator. On the other hand, when the override means are to be used through the exclusion of manipulation of the manually actuable operator, the aforementioned pivot point is then used as an operating means on the linkage with the connection of the link to the manually actuable operator now serving as a pivot point for adjustment of the control shaft of the hydraulic piston pump. Stated another way, the invention embodies a linkage having two movable pivot points, one of which remains fixed when normal manual adjustment of speed is made and the other of which remains fixed when the override means are put into operation.

DESCRIPTION OF THE PREFERRED EMBODIMENT

Figure 1:
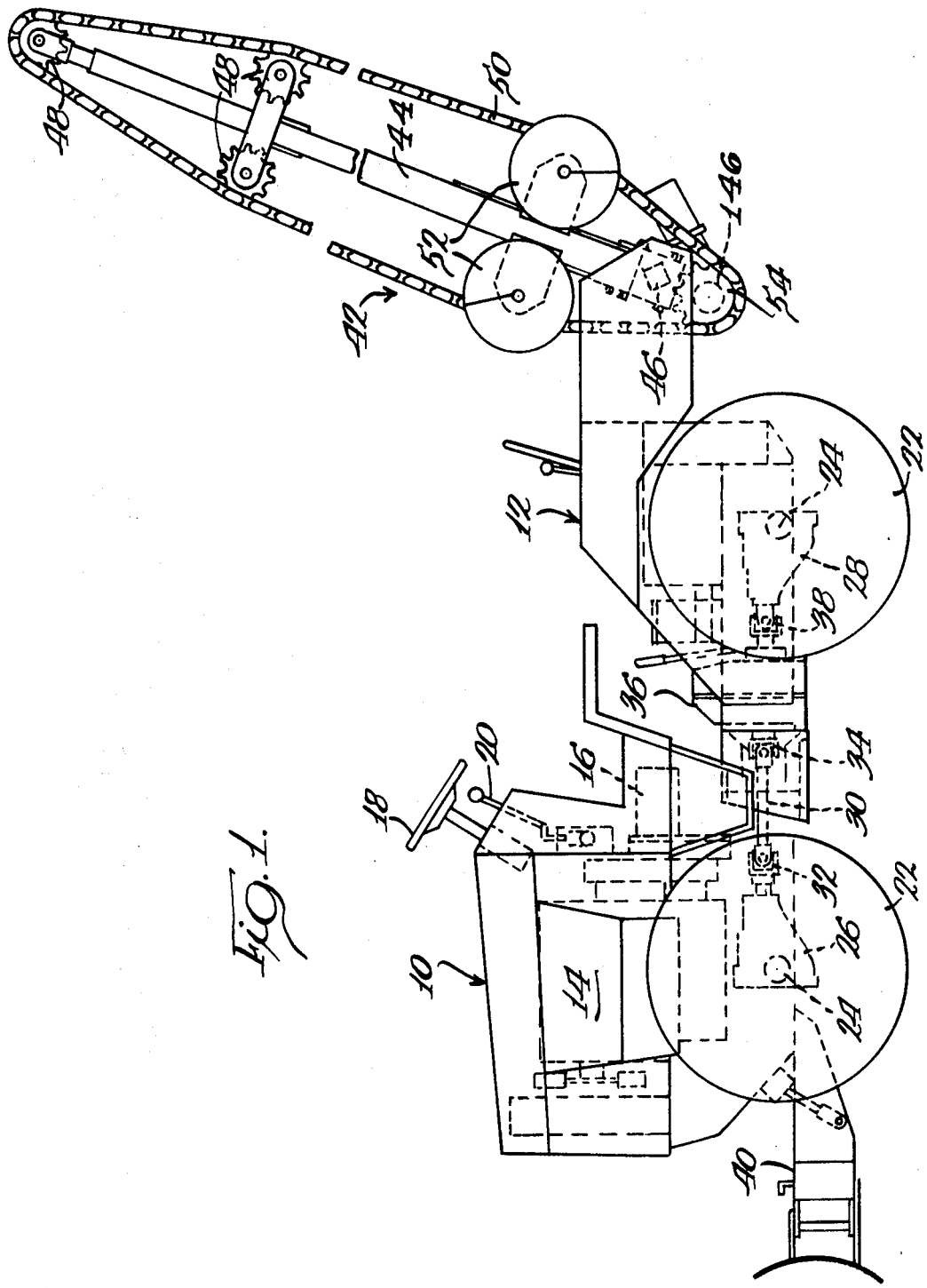
FIG. 1 is a side elevation of a vehicle embodying a speed control system including override means made according to the invention.

A speed control system according to the invention is embodied in an articulated vehicle having a first frame, generally designated 10, and a second frame, generally designated 12. Included in the first frame 10 is a power plant 14 which drives a plurality of hydraulic pumps including a conventional hydraulic piston pump 16. Additionally associated with the first frame 10 is a steering means 18 and a manually operable speed control means 20.

Both of the frames 10 and 12 mount wheels 22 on axles 24 associated with respective differentials 26 and 28.

The differential 26 receives rotary power via a drive shaft 30 which is coupled by a universal joint 32 to the differential 26 and a universal joint 34 to a hydraulic motor and transmission 36 which is driven by the hydraulic piston pump 16. The hydraulic motor and transmission 36 is connected by means of a universal joint 38 to provide rotary power to the differential 28.

As illustrated in FIG. 1, the forward end of the first frame 10 mounts plow means 40 which form no part of the present invention while the second frame 12 mounts a trenching apparatus, generally designated 42.

While in the exemplary embodiment the trencher 42 is shown as a work performing means mounted on the vehicle, as will become apparent hereinafter, the invention is not so limited. For example, the work performing means could be a sickle bar mower or a rotary mower or most any type of device which performs work as the vehicle moves along the ground.

In any event, the work performing means in the form of the trencher 42 comprises a boom 44 which is mounted on a shaft 46 which is pivotally mounted on a second frame 12. Various idler means 48 support a trenching chain 50. Additionally, there are provided augers 52 for clearing excavated material away from the trench when the trenching device is pivoted about the axis provided by shaft 46 to a trenching position. A drive for the chain 50 is provided by a driven sprocket 54 which is driven by a hydraulic motor not shown.

Figure 2:
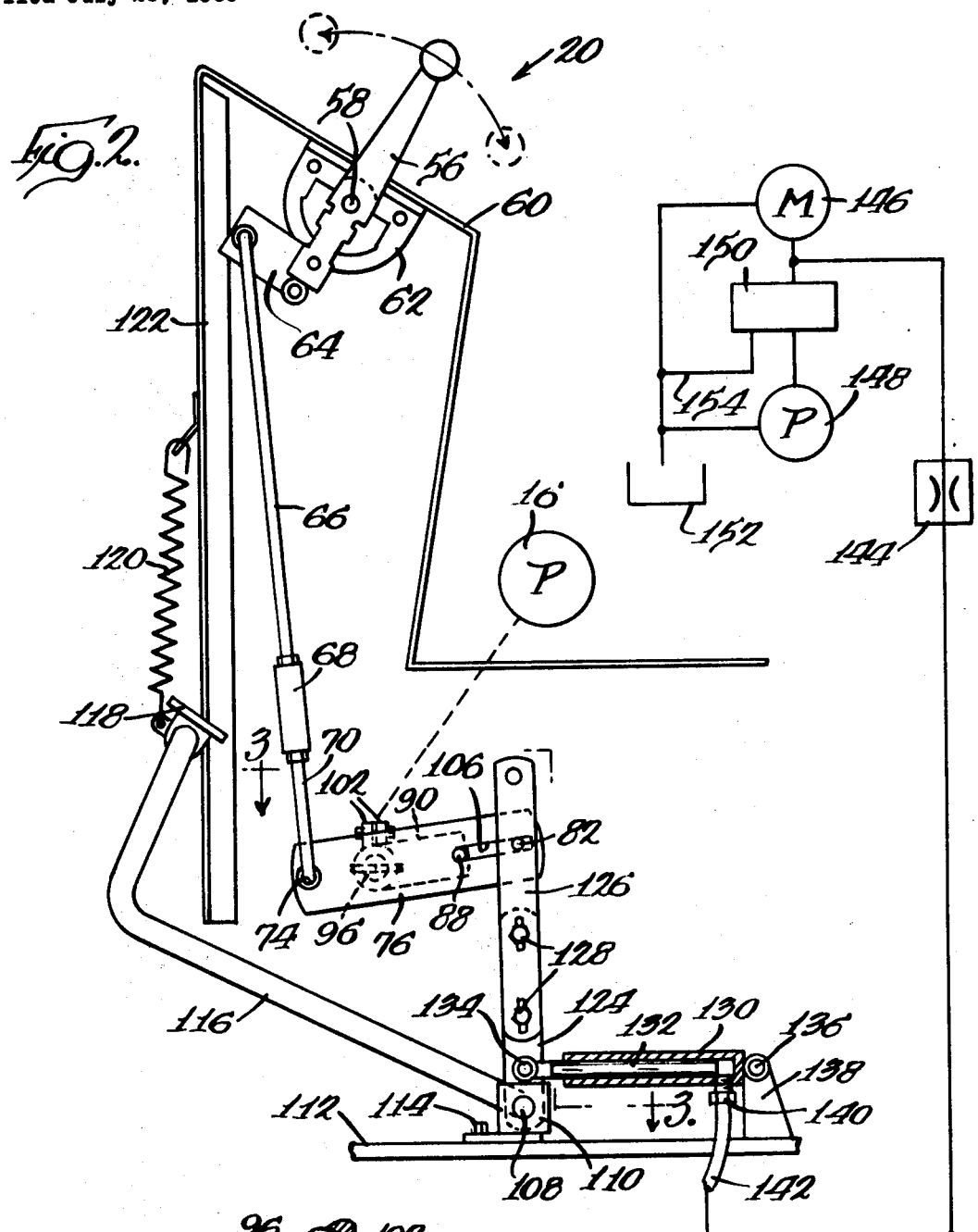
FIG. 2 is an enlarged, fragmentary view of the speed control system including the override means linkages.

Turning now to FIG. 2, the vehicle speed control and override means therefor will be seen in detail. The speed control means 20 comprises a manual actuator 56 which is pivotally mounted by a pivot pin 58 on the dashboard 60 of the vehicle for movement to an infinite number of positions between the two positions illustrated in dotted lines to provide a corresponding number of speed settings. As shown, the manual actuator 56 is in a neutral position.

Adjacent the pivot pin 58 is an arcuate member 62 which frictionally engages manual actuator 56 in such a way that the same will remain in any position in which it is manually set. Depending from and rigidly secured to the lowermost end of the manual actuator 56 is an arm 64 which pivotally mounts one end of a linkage formed by a first elongated member 66, a turnbuckle 68 and a second elongated member 70. The turnbuckle 68 serves to adjust the overall length of the linkage.

Figure 3:
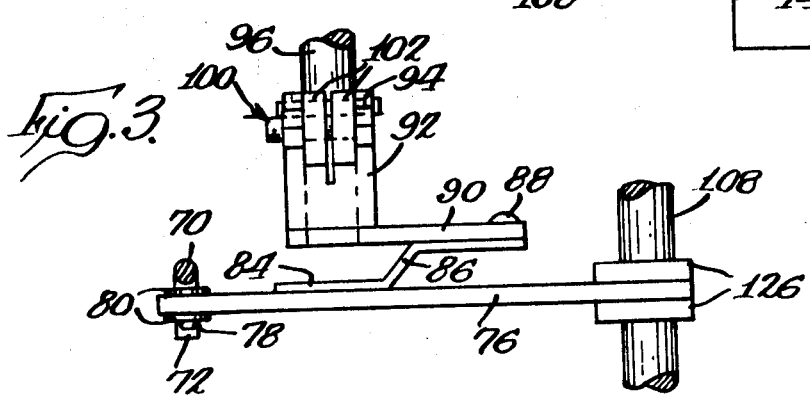
FIG. 3 is a fragmentary view taken approximately along the line 3—3 of FIG. 2.

As best seen in FIG. 3, the lower end of the elongated member terminates in a hooked end 72 which is passed through an aperture 74 in one end of a linkage plate 76. The connection also includes a cotter pin 78 and a pair of washers 80.

The other end of the linkage plate 76 is affixed to a movable pivot 82 and further includes a link 84 rigidly secured thereto and having an offset 86 therein. Adjacent one end of the offset 86 in the link 84 is a pivot pin 88 which pivotally connects the link 84 to a link 90.

The opposite end of the link 90 includes a sleeve member 92 having a bifurcated end 94 which receives a shaft 96 which is connected to the swash plate of the hydraulic piston pump 16 as schematically illustrated in FIG. 2. Construction of the shaft 96 and its relation to the swash plate of a hydraulic piston pump are well known in the art and need not be described further, it being sufficient to note that the output of the pump 16 is controlled by the rotative position of the shaft 96.

A bolt and nut connection, generally designated 100, is associated with ears 102 on the bifurcated end 94 of the sleeve 92 and when the bolt and nut combination 100 is tightened, a rigid connection between the shaft 96 and the link 90 results.

When the manual operator 56 is pivoted in a counterclockwise direction, as illustrated in FIG. 2, the linkage including members 66, 68 and 70 is moved downwardly thereby causing the link plate 76 to pivot in a counterclockwise direction about the movable pivot point 82. As a result, the link 84 including the offset 86 will be moved downwardly and in view of the pivotal connection by pivot pin 88 to the link 90, such movement will result in clockwise rotation of the shaft 96 connected to the swash plate of the hydraulic piston pump 16. Dependent upon the degree of movement of the manual actuator 56, the position of the shaft 96 and thus the flow rate of the hydraulic piston pump 16 can be regulated. As a result, the speed of the vehicle may be regulated.

When the manual actuator 56 is rotated in a clockwise direction, the link plate 76 will be moved in a clockwise direction about the movable pivot point 82 ultimately causing the link 90 to be moved in a counterclockwise direction so as to rotate the shaft 96 in a counterclockwise direction. This will result in opposite pumping action with the ultimate result being that the vehicle will move in the opposite direction.

As mentioned previously, the manual actuator 56 is shown in a neutral position and at this setting, the turnbuckle 68 is adjusted along with the nut and bolt combination 100 with respect to the shaft 96 so that the hydraulic piston pump 16 will be at a neutral position. Thus, there will be no movement of the vehicle.

As mentioned previously, the pivot provided by pivot pin 82 is movable. More specifically, pivot pin 82 is received in a slot 106 in link plate 76 and may be moved about a pivot point defined by a shaft 108.

Bearing means 110 are mounted on a frame member 112 of the vehicle by means of bolts 114 and journal the shaft 108. Secured to the shaft 108 is an L-shaped arm 116 which terminates in a foot pedal 118. A spring 120 is secured to the L-shaped arm 116 and to a frame member 122 of the vehicle so as to normally bias the L-shaped member 116 to the position illustrated in FIG. 2.

Extending upwardly from the shaft 108 and secured to the same for rotation therewith is an arm 124 which in turn mounts a pair of spaced arms 126 by means of bolts 128. The pivot pin 82 extends between the spaced arms 126 with the link plate 76 being located between the arms 126.

Completing the construction is a small hydraulic cylinder 130 having a piston 132 pivotally mounted as at 134 to the arm 124. The cylinder 130 is also pivotally connected as at 136 to a block 138 secured to the frame member 112. By means of a coupling 140 associated with a hydraulic hose 142, hydraulic fluid may be directed to the interior of the cylinder 132 and against the piston 134 to force the same to the left as illustrated in FIG. 2.

Hydraulic fluid under pressure is directed to the hose 142 through an orifice 144 which in turn is connected to the high pressure side of a hydraulic motor 146. The hydraulic motor 146 is arranged to operate the work performing means such as the trencher 42 illustrated in FIG. 1. Thus, in the exemplary embodiment, the motor 146 will operate to drive the sprocket 54.

Hydraulic fluid under pressure is directed to the motor 146 from a pump 148 through a control valve 150 and spent fluid from the motor 146 is directed to a tank 152. Provision is also made for the pump 148 to be provided with fluid from the tank 152 and the valve 150 may also be associated with a line 154 for directing fluid from the pump 148 to the tank 152 when the motor 146 is not to be energized.

The just-described construction provides override means for the manual operator 56. That is, the manual operator 56 may be set in any desired position so as to cause a vehicle to traverse the ground at a desired rate. However, in the event the rate is to be altered, the override means become effective. For example, when the operator desires to alter the rate, he need only step on the pedal 118.

Alternatively, should the work performing means become overloaded or, for that matter, merely encounter an increased load, the same will cause operation of the override means to decrease the rate at which the vehicle crosses the terrain. Thus, if a trencher is used, the slower speed rate of the vehicle will permit the same to adequately handle the increased load. Similarly, if other work performing means such as mowers are used, the decreased speed of the vehicle will permit them to handle the increased load.

The manner of operation of the override means is as follows. Assuming for the moment that the manual operator 56 has been set to a desired position and that the vehicle is traversing the ground at the corresponding rate of speed. Because of the frictional engagement of the operator 56 and the arcuate means 62, the position of the linkage including the means 66, 68 and 70 will be fixed and as a result, the position of the inturned end 72 will be fixed thereby defining a pivot point for the link plate 76. When the operator depresses the pedal 118, the shaft 108 will be rotated in a counterclockwise direction thereby moving the arms 126 and the pivot pin 82 in an arcuate path to the left in FIG. 2. Movement of the pivot pin 82 within the slot 106 causes the link plate 76 to be cammed upwardly and counterclockwise with respect to the pivot axis defined by the inturned end 72 and as a result, the link 84 will be moved in a counterclockwise direction about said pivot axis thereby causing the link 90 to be moved in a counterclockwise direction and thus the shaft 96 will be rotated in a counterclockwise direction.

Of course, the degree of movement of the shaft 96 in the counterclockwise direction will be dependent upon the degree to which the pedal 118 is depressed. As a result, it will be appreciated that by selectively varying the position of the pedal 118, an operator can infinitely vary the speed of the vehicle without changing the manual setting of the manual operator 56. In general, it will be desirable to adjust the linkage so that complete depression of the pedal 118 will cause rotation of the shaft 96 to a neutral position so that motion of the vehicle will cease.

When the operator releases the foot pedal 118, the spring 120 will restore the shaft 108, the arms 126 and thus the pivot pin 82 to their previous position thereby causing the vehicle to be operated in accordance with the setting of the manual actuator 56.

Automatic operation of the override means is as follows. If it be assumed that the trencher 42 is in operation and the vehicle is traversing the ground at a present rate determined by the setting of the manual actuator 56, and the trencher is operating normally, being driven by the motor 146, should the same encounter a change in soil condition so as to increase the load thereby requiring that more time be expended to dig a given length of trench because of the increased amount of work required, it will be appreciated that when change in soil condition is encountered and the greater work load increased, the resistance to the trencher chain 50 will be fed back to the motor 146 and cause a pressure buildup on the high pressure side of the motor 146. This increase in pressure will be passed along through the orifice 144 to the cylinder 130 and as the pressure builds up, the same will tend to cause counterclockwise movement of the arms 126 about the pivot axis defined by shaft 108 against the bias of the spring 120. Depending upon the amount of such pressure increase, the position of the pivot pin 82 will vary and thus the rate at which the vehicle will travel across the terrain will be regulated according to the pressure on the high pressure side of the motor 146 driving the work performing means and thus in proportion to the amount of work required during a given period of time.

A further advantage of the just-described system is present in the mode of operation of the override means when significant resistance to the motion of the vehicle is encountered. In such a case, and as will be obvious to those skilled in the art, the resultant increase in pressure in the hydraulic motor and transmission 36 will be fed back to the hydraulic piston pump 16 and as a result, the pressure feedback will be such as to cause the swash plate to tend to return to its neutral position. Were the linkage rigid, such a return would be resisted with the possible result of damage to the equipment. However, in a system made according to the invention, even though the position of the actuator 56 remains constant, the swash plate may return to its neutral position inasmuch as pivotal movement of the linkage is permitted about a pivot axis defined by the inturned end 72 of the member 70 and against the bias of the spring 120.

From the foregoing, it will be seen that the invention provides an extremely flexible drive control means which may be manually set to a predetermined speed rate and thereafter may either automatically or manually be overridden in accordance with the exigencies with a given situation. Thus, the system is operative not only for an increased work load of work performing means associated with the vehicle, but also may be used with advantage in panic situations or where cautious movement is temporarily required. Furthermore, the system inherently resists self-damage due to overload.

I claim:
1. In a vehicle having ground engaging propulsion means and variable speed drive means therefor, said variable speed drive means including a rotatable control shaft, the combination comprising: linkage means operatively associated with said shaft for rotating the same to control the speed of the ground engaging means; a manual operator settable to a plurality of positions to dictate a desired vehicle speed, said manual operator being connected to said linkage means at a first point and operative to cause said linkage means to move relative to a second point; and override means including an operator connected to said linkage means at said second point and operative to move the same relative to said first point; and means normally operative to maintain the position of said second point constant except when said override means are actuated.

2. The combination of claim 1, wherein both said first and second points are defined by pivots.

3. The combination of claim 1, wherein said linkage means comprises a link plate pivotally connected to said manual operator at said first point and movably connected to said override means operator at said second point.

4. The combination of claim 3, wherein the movable connection at said second point is defined by a pin and slot connection.

5. The combination of claim 1, wherein said override means operator comprises a foot pedal.

6. The combination of claim 1, wherein said override means operator comprises a motor and means adapted to be associated with work performing means for sensing the power requirements of the same and responsive to an increase in the power requirement for actuating said motor.

7. The combination of claim 6, wherein said motor comprises a hydraulic cylinder and said sensing means comprises a line communicating with said hydraulic cylinder and adapted to be associated with a hydraulically operated work performing appliance at the high pressure side thereof.

8. The combination of claim 7, wherein said override means operator further includes a foot pedal.

9. A vehicle comprising: a frame, propulsion means mounted on said frame; a variable speed drive means, including a hydraulic piston pump having a rotary control shaft and associated with said propulsion means; linkage means operatively associated with said control shaft to rotate the same to thereby control the speed of the vehicle, said linkage means including a first link secured to said control shaft and a second link pivotally secured to said first link; manual operating means settable to a plurality of vehicle speed determining positions and pivotally connected to said second link, an override operator movably connected to said second link; and means whereby said override operator may be moved to temporarily alter the speed of the vehicle without changing the speed setting thereof.

10. The combination of claim 9, wherein the movable connection between said second link and said override operator comprises a pin and slot connection, and said override operator comprises a pivotally mounted arm, and further including means normally biasing said arm to a predetermined position.

11. In a vehicle having ground engaging propulsion means and variable speed driving means therefor, said variable speed drive means including a rotatable control shaft, the combination comprising: linkage means operatively associated with said shaft for rotating the same to control the speed of the ground engaging means, said linkage means including a first link secured to the shaft, a second link, means pivotally securing said first link to said second link at a predetermined point thereon; a manual operator settable to a plurality of positions to dictate a desired vehicle speed, said manual operator being connected to said second link at a first point different from said predetermined point and operative to cause said second link to move relative to a second point different from said predetermined point; and override means including an operator connected to said second link at said second point and operative to move the same relative to said first point; and means normally operative to maintain a position of said second point constant except when said override means are actuated.

12. The invention of claim 11 wherein said override operator is manually actuatable.

13. The invention of claim 11 wherein said override operator comprises a motor.

14. The invention of claim 11 wherein said override operator is adapted to be manually operated and further comprises a motor for power driven actuation.

References Cited

UNITED STATES PATENTS

| | | | |
|---|---|---|---|
| 2,755,877 | 7/1956 | Kelem | 180—109 |
| 2,914,960 | 12/1959 | Edgerton | 180—190X |
| 3,023,828 | 3/1962 | Fuller et al. | 180—109 |
| 3,084,758 | 4/1963 | Thorner | 180—109 |
| 3,099,329 | 7/1963 | Von Berg et al. | 180—109 |

A. HARRY LEVY, Primary Examiner

U.S. Cl. X.R.

37—86; 180—14.5, 77R, 109, 51, 66